March 12, 1957     H. C. WERNECKE     2,784,930
CLINCH NUT FASTENER
Filed April 1, 1955
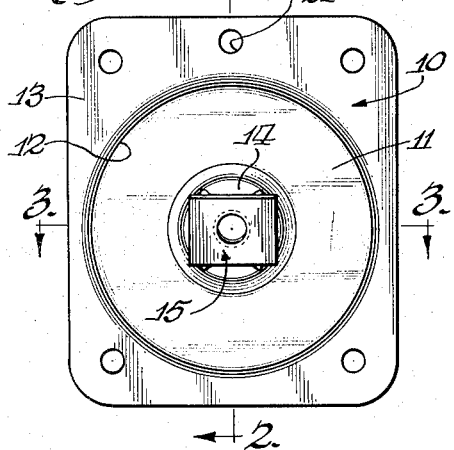
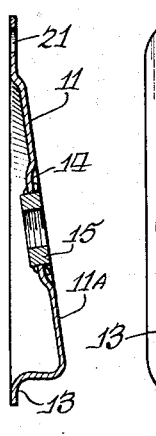
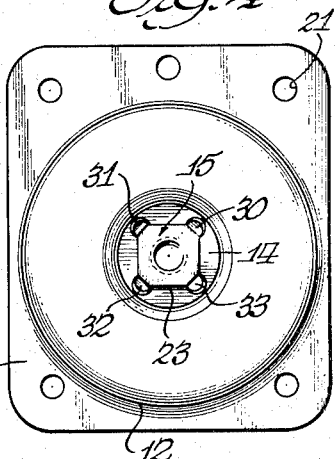
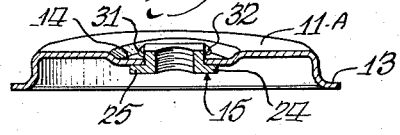
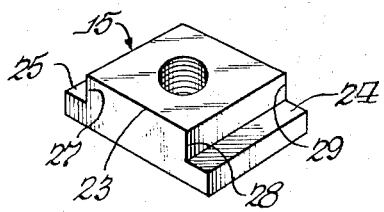
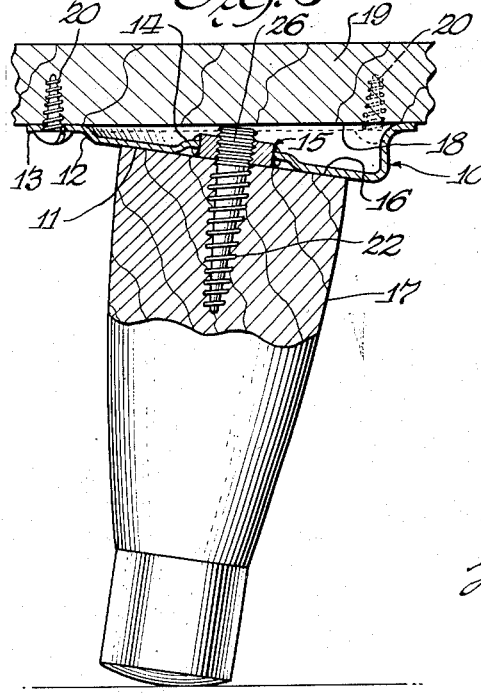
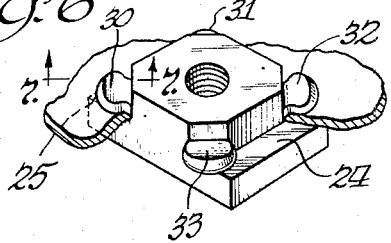
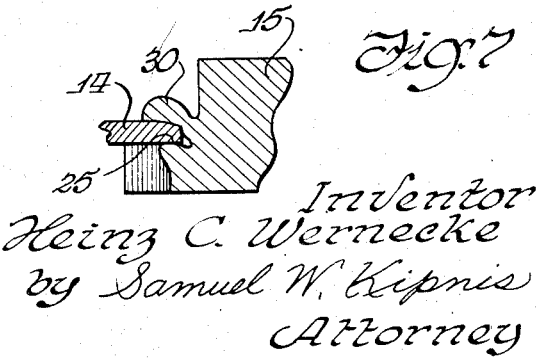
Inventor
Heinz C. Wernecke
by Samuel W. Kipnis
Attorney

# 2,784,930

CLINCH NUT FASTENER

Heinz C. Wernecke, Bangor, Mich., assignor, by mesne assignments, to Victor Supply Company, Grand Rapids, Mich., a corporation of Michigan Application April 1, 1955, Serial No. 498,636

2 Claims. (Cl. 248—188)

This invention relates to fastening members for the purpose of removably interconnecting wood products and the like, such as furniture units and their legs.

Many types of hardware have been used and proposed for such purposes. Direct interconnection, for instance by wooden pegs or by metal bolts with double wood screw threads, is usually impractical in modern furniture, because of insufficient thickness of the wooden base structure. Castings and the like have been employed as connectors, but they tend to make the furniture unduly expensive. Therefore it is rather usual to work with attaching hardware formed from stamped steel plates and the like, with a set of small wood screws for attaching the plate to the wooden base structure and with a sturdy central nut and bolt for attachment of the leg. The present improvement relates to this latter type of hardware.

Heretofore the central nut of such a plate was usually spotwelded to the thin, more or less flat metal of the plate. Difficulties were encountered with that construction; mainly because of weld shrinkage and distortion. Firmness and/or orientation of the attached legs often become doubtful.

I have now discovered means for safeguarding firmness and accuracy of attachment of legs, at the same time even reducing the cost of the hardware.

This improvement has been provided by suitably using, in the center of the plate between furniture base and leg, a clinch nut element of a general type heretofore used in entirely different combinations.

In the drawing:

Figure 1 is a top view of a typical leg-attaching plate according to this invention.

Figure 2 is a section through the plate along lines 2—2 in Figure 1.

Figure 3 is a section through the plate and attached wood structures along lines 3—3 in Figure 1.

Figure 4 is a bottom view of the plate without the wood structures.

Figure 5 is a perspective view of the central clinch nut before assembly.

Figure 6 is a diagram of the clinch nut in the form which it receives in the process of assembling it with the plate; and Fig. 7 is a partial, cross sectional, elevational view of a slightly modified clinch nut.

Fig. 8 is a cross sectional, elevational view of the plate and leg assembly.

As shown in Figures 1 to 3 the present leg-attaching plate 10 is made of flat metal plate in form of a shallow bowl, having a bottom 11, side wall 12 and peripheral flange 13. A central portion 14 of the plate is raised to a level intermediate the bottom 11 and flange 13. The vertical distance 11—14 is sufficient to accommodate the lower portion of a central, forged steel clinch nut 15; and the vertical distance 14—13 is sufficient to accommodate the upper portion of the same clinch nut, without need for recesses in the top surface 16 of the leg 17 or in the bottom surface 18 of the wooden base 19. A square hole to allow insertion of the lower, square part of the clinch nut 15, is formed in the raised central plate portion 14. A suitable number of relatively small holes for wood screws 20 are formed in the flange 13; and there may be suitable location or dowel holes 21. Depending upon the style of furniture for which the hardware is intended, the flange 13 may be parallel to the bottom 11, as shown in Figure 2, or offset or inclined as shown in Figure 7, see bottom 11A.

The clinch nut 15 provides a socket for the upper, machine screw threaded portion 21 of a hanger bolt. The lower or wood screw threaded portion 22 of that bolt is driven into the top surface 16 of the leg 17. Rotation of the leg relative to the base structure is prevented by the feature that the wood screw threaded portion 22 is driven into the leg down to its very end and that the machine thread engagement of parts 15 and 21 is substantially complete. A slight space is left between the underside of the clinch nut and the top surface of the leg, thereby employing the resiliency of the steel plate structures 11, 14 to provide an action like that of a large spring washer.

In order to insure proper attachment and orientation of the leg 17, relative to the base 19, it is important to maintain predetermined relationships between the furniture base and legs. This is achieved in Figure 2 by an accurate parallel arrangement of parts 11, 13 and 14; and in Figure 7 by a predetermined angularity of part 13 to the parallel parts 11 and 14.

The spotwelding of a nut to a plate, as mentioned, has frequently caused inaccuracies; and these were often discovered only when attempts were made to use the attachment plates, long after their manufacture. In some cases the difficulty was that the machine screw hole, extending through the nut, was not accurately at right angles to the bottom of the plate, tending to interfere with the required tight fit of the hanger bolt 21, 22. In other cases the difficulty was that the bottom of the plate, and accordingly the leg, was oriented improperly.

These defects are avoided by the novel clinch nut application, most clearly illustrated in Figures 4 to 6.

Before use, the clinch nut 15 is an ordinary shouldered nut. It has a centrally threaded body portion 23, here shown as having a square outline to match the square hole in the plate 10; and it has an integral shoulder portion 24, 25, here shown as extending outwards on two opposite sides of the body portion 23.

When this nut has been inserted in the square hole of the plate 10, a clinch joint is produced. For this purpose it is desirable to turn the body portion 23 upwards. A cutting and bending operation is then performed, wherein the four corners 26, 27, 28, 29 of the body portion 23 are simultaneously, partly split from said base portion and bent outwards by a wedge action into the form of clinch members or ears 30, 31, 32, 33, clamping the plate portion 14 between said ears and the shoulders 24, 25. These operations can be performed in a single stroke, as is known to the metal-forming art. The details need not be described.

Likewise it is well known how the plate 10 and the various parts thereof can be formed in a single operation.

It may be noted that the forming of the plate 10 and the clinching of the nut 15 can both be done on basically similar machines or sometimes on one and the same machine, whereas former types of attachment plates required the use of different machines.

I claim:

1. In a mounting plate for a furniture leg the combination comprising: a plate having a peripheral attachment flange and an offset portion offset in an outward direction from the plane of said flange; said offset portion having a face spaced outwardly from said flange; said face having an outermost portion on which the top of said furniture leg is adapted to be secured; a central recessed portion in said face offset inwardly from said outermost face portion; a rectilinear opening in said recessed portion; a nut having a shank portion adapted to seat through said opening and a head portion adapted to seat against one face of the recessed portion; portions of said nut shank being deformed radially outwardly and clinched against the other face of said recessed portion; the length of said shank portion, the height of said head portion, and the depths of said offset and recessed portions being interrelated such that the nut is contained between and spaced from the plane of said flange and the plane of said outermost face portion whereby said flange can seat flat against a support surface and a flat leg end when placed against said outermost portion of said face is spaced from said nut.

2. In a mounting plate for a furniture leg the combination comprising: a plate having a peripheral attachment flange and an offset portion offset in an outward direction from the plane of said flange; said offset portion having a face spaced outwardly from said flange; said face having an outermost portion on which the top of said furniture leg is adapted to be secured; a central recessed portion in said face offset inwardly from said outermost face portion; a rectilinear opening in said recessed portion; a nut having a shank portion adapted to seat through said opening and a head portion adapted to seat against the inner face of the recessed portion; portions of said nut shank being deformed radially outwardly and clinched against the outer face of said recessed portion; the height of said head portion and the depth of said offset portion being such that the head is contained in said offset portion and spaced outwardly from the plane of said flange; the length of said shank portion and the depth of said recessed portion being such that the end of said shank is spaced from the plane of the outermost portion of said face whereby a flat leg end placed on said face is spaced from said end of said shank portion.

References Cited in the file of this patent

UNITED STATES PATENTS

| | | |
|---|---|---|
| 918,665 | Gingrich | Apr. 20, 1909 |
| 1,903,863 | Hayden | Apr. 18, 1933 |
| 2,113,159 | Moxley | Apr. 5, 1938 |
| 2,545,347 | Embree | Mar. 13, 1951 |